(12) United States Patent
Citron (10) Patent No.: US 6,586,541 B2
(45) Date of Patent: Jul. 1, 2003

(54) PROCESS FOR PRODUCTION OF POLYOLEFINS

(75) Inventor: Joel David Citron, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 208 days.

(21) Appl. No.: 09/774,297

(22) Filed: Jan. 30, 2001

(65) Prior Publication Data

US 2002/0026016 A1 Feb. 28, 2002

Related U.S. Application Data (60) Provisional application No. 60/179,824, filed on Feb. 2, 2000.

(51) Int. Cl.⁷ .......................... C08F 4/70; C08F 110/02; C08F 210/16; C08F 2/04
(52) U.S. Cl. .................. 526/113; 526/114; 526/115; 526/117; 526/160; 526/64; 526/65; 526/352; 525/240; 585/12; 585/329; 585/517
(58) Field of Search .................. 526/64, 65, 113, 526/114, 115, 117, 160, 352; 525/240; 585/12, 329, 517

(56) References Cited

U.S. PATENT DOCUMENTS

| 5,071,927 A | * | 12/1991 | Benham et al. ............... 526/64 |
| 5,137,994 A |   | 8/1992  | Goode et al. |
| 5,686,542 A |   | 11/1997 | Ostoja-Starzewski et al. |
| 5,753,785 A |   | 5/1998  | Reddy et al. |
| 5,856,610 A | * | 1/1999  | Tamura et al. ............... 585/517 |

FOREIGN PATENT DOCUMENTS

| WO | WO 99/50318 | 10/1999 |

OTHER PUBLICATIONS

Benham, E. A. et al., A Process for the Simultaneous Oligomerization and Copolymerization of Ethylene, Polymer Engineering and Science, Nov. 1988, p. 1469–1472, vol. 28, No. 22.

Denger, C. et al., Simultaneous oligomerization and polymerization of ethylene, Makromol. Chem., Rapid Commun., 1991, p. 697–701, vol. 12.

* cited by examiner

Primary Examiner—D. R. Wilson
Assistant Examiner—R. Rabago (57) ABSTRACT

Polyolefins, especially branched polyethylenes, can be made by combining a catalyst that can oligomerize ethylene to one or more alpha-olefins and a polymerization catalyst which can copolymerize ethylene and α-olefins, by first carrying out the process in, for example, a continuous stirred tank reactor or its equivalent, and then in a plug flow reactor or its equivalent. The process minimizes the occurrence of (unreacted) α-olefins in the final polymer product.

20 Claims, 1 Drawing Sheet

FIG. 1

PROCESS FOR PRODUCTION OF POLYOLEFINS

CROSS-REFERENCE TO RELATED APPLICATION

This application claims priority under 35 U.S.C. §119 from U.S. Provisional Application Ser. No. 60/179,824 (filed Feb. 2, 2000), which is incorporated by reference herein as if fully set forth.

FIELD OF THE INVENTION

Branched polyethylene can be made in a multi-step process by contacting ethylene, a catalyst that can oligomerize ethylene to one or more alpha-olefins, and a polymerization catalyst which can copolymerize ethylene and α-olefins, in a first step (such as in a continuous stirred tank reactor), then continuing the reaction in a subsequent step (such as in a plug flow reactor) in the substantial absence of added ethylene.

TECHNICAL BACKGROUND

Polyolefins are useful items of commerce, being made in immense annual quantities and used for a variety of purpose, such as molding resins, films, elastomers, and other items. Polyolefins are most often prepared by polymerization processes in which a transition metal containing catalyst system is used. Depending on the process conditions used and the catalyst system chosen, polymers, even those made from the same monomer(s) may have varying properties. Some of the properties which may change are molecular weight and molecular weight distribution, crystallinity, melting point, branching, and glass transition temperature. Except for molecular weight and molecular weight distribution, branching can affect all the other properties mentioned.

Various reports of "simultaneous" oligomerization and polymerization of ethylene to form (in most cases) branched polyethylenes have appeared in the literature, see for instance WO90/15085, WO99/50318 (corresponding to U.S. application. Ser. No. 09/619,509, filed Jul. 19, 2000, now abandoned, which is a continuation of U.S. application. Ser. No. 09/273,409, filed Mar. 22, 1999), now U.S. Pat. Nos. 6,214,761, 5,753,785, 5,856,610, 5,686,542, 5,137,994 and 5,071,927; C. Denger, et al, *Makromol. Chem. Rapid Commun.*, vol. 12, p. 697–701 (1991); and E. A. Benham, et al., *Polymer Engineering and Science*, vol. 28, p. 1469–1472 (1988). All of the above are incorporated by reference herein for all purposes as if fully set forth.

In most of these systems one or more α-olefins is produced by catalysis with an ethylene oligomerization catalyst, and then a copolymer of the α-olefin(s) and ethylene is produced by (another) polymerization catalyst. The result is normally a branched polyethylene made from ethylene alone (although other olefins such as α-olefins may also be added if desired).

In most instances, the rate of formation of polymer is faster than the rate of oligomerization, so that the incorporation of α-olefin(s) is often quite low, and of course the resulting branching is quite low. When the rate of α-olefin production is comparable to the rate of polymer production it is possible to make relatively more α-olefin, and consequently to obtain a higher branching level in the polymer, see for instance previously incorporated World Patent Application 99/50318 (corresponding to U.S. application Ser. No. 09/619,509, filed Jul. 19, 2000, now abandoned, which is a continuation of U.S. application. Ser. No. 09/273,409, filed Mar. 22, 1999now U.S. Pat. No. 6,214,761). However this can lead to another problem, namely, the presence of residual α-olefin(s) in the resulting polymer product.

While this may not be too serious if the α-olefin(s) are relatively volatile (say containing 8 or fewer carbon atoms), when less volatile α-olefin(s) are present, their removal may be come difficult, and their presence in the polymer deleterious from a flammability, toxicity or end use (e.g., in contact with food, as food wrapping) viewpoint. Thus a production method that minimizes or even substantially eliminates the presence of these α-olefin(s) in the final product is desirable.

SUMMARY OF THE INVENTION

This invention concerns a process for the production of a branched polyethylene comprising the steps of contacting, under polymerization conditions:

(a) ethylene;

(b) an oligomerization catalyst that oligomerizes ethylene to one or more α-olefins of the formula $R^{20}CH=CH_2$, wherein $R^{20}$ is n-alkyl containing an even number of carbon atoms, and (c) a transition metal polymerization catalyst that co-polymerizes ethylene and one or more of the α-olefins produced by the oligomerization catalyst, to produce a first (intermediate) product comprising a predominant amount of a branched polyethylene, a first residual α-olefin content and, optionally, an amount of unreacted ethylene; then (2) allowing the first product to further react under conditions to (co)polymerize at least a portion of the first residual α-olefin content, in the substantial absence of added ethylene, to result in a second (end) product comprising a branched polyolefin having a second residual α-olefin content, provided that said second residual α-olefin content is at least 20% less than said first residual α-olefin content.

This invention also concerns a process for the production of a branched polyethylene, comprising the step of contacting, under polymerizing conditions:

(a) ethylene, (b) an ethylene oligomerization catalyst which is capable under the process conditions of producing one or more olefins of the formula $R^{20}CH=CH_2$ wherein $R^{20}$ is n-alkyl containing an even number of carbon atoms, and (c) a polymerization catalyst which contains one or more transition metals and which is capable under process conditions of copolymerizing ethylene and one or more olefins of the formula $R^{21}CH=CH_2$, wherein $R^{21}$ is n-alkyl, provided that a major portion of the branched polyethylene is produced first in a continuous stirred tank reactor (CSTR) or its equivalent, and that a minor portion of said branched polyethylene is produced subsequently in a plug flow reactor (PFR) or its equivalent.

DETAILED DESCRIPTION OF THE PREFERRED EMBODIMENTS

In this application several terms are used and are defined below.

By a "polyethylene" is meant a polymer in which at least 50 mole percent, more preferably at least 75 mole percent of the repeat units are derived from ethylene. By "derived from ethylene" is meant they are directly polymerized ethylene molecules, or they are other monomers (such as α-olefins) made within the process from ethylene molecules.

By a "homopolyethylene" is meant a polymer which is made in a process in which ethylene is substantially the only olefin monomer fed to the process reactors, even if the ethylene is converted to another molecule within the process, that other molecule (such as an α-olefin) then being polymerized. "Substantially only ethylene" in this context includes ethylene feeds that may also contain minor amounts of other olefin and other impurities typical for commercial scale operations.

"In the substantial absence of added ethylene" refers to the fact that no new ethylene feed is added in the later reaction stage(s) (such as in the PFR). Unreacted ethylene may, however, be present in the later reaction stage(s) from one or more earlier stage(s) (such as in the CSTR), but it may also be preferable to remove a substantial portion of this unreacted ethylene by an intermediate separation step (such as a flash step) as discussed below in more detail.

By "said second residual α-olefin content is at least X% less than said first residual α-olefin content" refers to the relative weights of the first and second residual α-olefin contents in the total process stream prior and subsequent to, respectively, the continued (co)polymerization step (which takes place in the substantial absence of added ethylene). For example, if X% is 20%, and if the process stream (e.g., first product) contained 10 wt % residual α-olefin content prior to the PFR, then the process stream exiting the PFR (e.g., second product) could contain no more than 8 wt % residual α-olefin content (10*(1−0.X)).

By a "polymerization catalyst" is meant a catalyst system which is capable of making a polymer having an average degree of polymerization (average number of repeat units) of about 50 or more, preferably about 100 or more.

By an "oligomerization catalyst" is meant a catalyst system which is capable of oligomerizing ethylene to an oligomer having an average degree of polymerization of about 40 or less, more preferably about 20 or less, and especially preferably about 20 or less.

Included within the definitions of "oligomerization catalyst" and "polymerization catalyst" are any other components of the catalyst system which are needed to provide an active catalyst, such as cocatalysts, for example alkylaluminum compounds. Also included are other catalyst components which may be present such as catalyst supports, for example silica, alumina or a polymer.

A "hydrocarbyl group" is a univalent group containing only carbon and hydrogen. If not otherwise stated, it is preferred that hydrocarbyl groups (and alkyl groups) herein contain 1 to about 30 carbon atoms.

By "substituted hydrocarbyl" herein is meant a hydrocarbyl group that contains one or more substituent groups which are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that substituted hydrocarbyl groups herein contain 1 to about 30 carbon atoms. Included in the meaning of "substituted" are chains or rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "(inert) functional group" herein is meant a group other than hydrocarbyl or substituted hydrocarbyl that is inert under the process conditions to which the compound containing the group is subjected. The functional groups also do not substantially interfere with any process described herein that the compound in which they are present may take part in. Examples of functional groups include halo (fluoro, chloro, bromo and iodo), and ether such —OR$^{18}$ wherein R$^{18}$ is hydrocarbyl or substituted hydrocarbyl. In cases in which the functional group (such as such as R$^4$, R$^5$, R$^8$, R$^{12}$, R$^{13}$, and R$^{17}$ shown below) may be near a transition metal atom (such as an iron atom shown below), the functional group should not coordinate to the transition metal atom more strongly than the groups in those compounds which are shown as coordinating to the transition metal atom, that is they should not displace the desired coordinating groups.

"Alkyl group" and "substituted alkyl group" have their usual meaning (see above for substituted under substituted hydrocarbyl). Unless otherwise stated, alkyl groups and substituted alkyl groups preferably have 1 to about 30 carbon atoms.

By "aryl" is meant a monovalent aromatic group in which the free valence is to the carbon atom of an aromatic ring. An aryl may have one or more aromatic rings which may be fused, connected by single bonds or other groups.

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

By a "cocatalyst" or a "catalyst activator" is meant one or more compounds that react with a transition metal compound to form an activated catalyst species. One such catalyst activator is an "alkyl aluminum compound" which, herein, is meant a compound in which at least one alkyl group is bound to an aluminum atom. Other groups such as, for example, alkoxide, hydride and halogen may also be bound to aluminum atoms in the compound. See below for preferred alkylaluminum compounds.

By a "primary carbon group" herein is meant a group of the formula —CH$_2$—, wherein the free valence—is to any other atom, and the bond represented by the solid line is to a ring atom of a substituted aryl to which the primary carbon group is attached. Thus the free valence—may be bonded to a hydrogen atom, a halogen atom, a carbon atom, an oxygen atom, a sulfur atom, etc. In other words, the free valence— may be to hydrogen, hydrocarbyl, substituted hydrocarbyl or a functional group. Examples of primary carbon groups include —CH$_3$, —CH$_2$CH(CH$_3$)$_2$, —CH$_2$Cl, —CH$_2$C$_6$H$_5$, —OCH$_3$ and —CH$_2$OCH$_3$.

By a "secondary carbon group" is meant the group wherein the bond represented by the solid line is to a ring atom of a substituted aryl to which the secondary carbon group is attached, and both free bonds represented by the dashed lines are to an atom or atoms other than hydrogen. These atoms or groups may be the same or different. In other words the free valences represented by the dashed lines may be hydrocarbyl, substituted hydrocarbyl or inert functional groups. Examples of secondary carbon groups include —CH(CH$_3$)$_2$, —CHCl$_2$, —CH(C$_6$H$_5$)$_2$, cyclohexyl, —CH(CH$_3$)OCH$_3$, and —CH=CCH$_3$.

By a "tertiary carbon group" is meant a group of the formula wherein the bond represented by the solid line is to a ring atom of a substituted aryl to which the tertiary carbon group is attached, and the three free bonds represented by the dashed lines are to an atom or atoms other than hydrogen. In other words, the bonds represented by the dashed lines are to hydrocarbyl, substituted hydrocarbyl or inert functional groups. Examples of tetiary carbon groups include —C(CH$_3$)$_3$, —C(C$_6$H$_5$)$_3$, —CCl$_3$, —CF$_3$, —C(CH$_3$)$_2$OCH$_3$, —C≡CH, —C(CH$_3$)$_2$CH=CH$_2$, aryl and substituted aryl such as phenyl and 1-adamantyl.

By a "continuous stirred tank reactor" (CSTR) is meant the classical definition of a reactor in which there is a continuous flow of reactants (and optionally other materials such as solvent) into the reactor and a continuous flow (usually equal to the inflow) of product plus other constituents out of the reactor, and importantly the reactor contents are agitated so that (at least in theory) they are uniform throughout the reactor volume. Often CSTRs are run at steady state conditions, that is the mass and composition of the inflow(s), reactor content and outflow(s) are constant. Most commonly CSTRs are used for liquid solution or slurry reactions, but herein include reactions that have significant gas phase(s), for example ethylene.

By a "plug flow reactor" (PFR) (sometimes also called a "tubular reactor") is meant a "continuously operating reactor in which there is a steady movement of one or all of the reagents, in a chosen spatial direction (the reagents often entering at one end of the reactor and leaving at the other) and in which no attempt is made to induce mixing between elements of fluid at different points along the direction of flow" (quote from K. G. Denbigh, et al., see below). The concentration of various process materials, especially reactants and products, will usually vary along the length of the PFR.

CSTRs and PFRs are well known in the art, both in theory and in practice, and are widely used in the chemical industry, see for instance, B. Elvers, et al., Ed., *Ullmann's Encyclopedia of Chemical Technology*, Vol. B4, VCH Verlagsgesellschaft mbH, Weinheim, 1992, p. 27–29 and 131–140; S. M. Walas in *Perry Chemical Engineer's Handbook*, 7$^{th}$ Ed., McGraw Hill Book Co., New York, 1997, Section 23; and K. G. Denbigh, et al., *Chemical Reactor Theory*, 3$^{rd}$ Ed., Cambridge University Press, 1984, all of which are hereby included by reference.

The oligomerization catalyst herein produces an α-olefin of the formula R$^{20}$CH=CH$_2$, wherein R$^{20}$ is n-alkyl having an even number of carbon atoms. This catalyst is preferably a transition metal containing catalyst and a number of such catalysts are known to produce α-olefin(s) by oligomerization of ethylene. See, for example, the previously incorporated references mentioned in the "Technical Background" section.

In some instances such catalysts predominantly produce only one or two specific an α-olefin(s), while other catalysts are known to produce a range of α-olefins. The distribution of α-olefins produced by the latter type of oligomerization catalyst often follows the so-called Schulz-Flory distribution. This is a measure of the molecular weights of the olefins obtained has a factor K (see for instance B. Elvers, et al., Ed. *Ullmann's Encyclopedia of Industrial Chemistry*, Vol. A13, VCH Verlagsgesellschaft mbH, Weinheim, 1989, p. 243–247 and 275–276). This is defined as:

$$K=n(C_{n+2} \text{ olefin})/n(C_n \text{ olefin})$$

wherein $n(C_n$ olefin) is the number of moles of olefin containing n carbon atoms, and $n(C_{n+2}$ olefin) is the number of moles of olefin containing n+2 carbon atoms, or in other words the next higher oligomer of $C_n$ olefin. From this can be determined the weight (mass) fractions of the various olefins in the resulting oligomeric reaction product mixture. The K factor in the present process is preferred to be in the range of about 0.6 to about 0.9, more preferably about 0.7 to about 0.8. For some of the oligomerization catalysts used, the K factor may be varied by changing process conditions and/or the particular transition metal catalyst used.

A preferred oligomerization catalyst comprises an iron complex of a compound of the formula (I)

(I)

wherein:
R$^1$, R$^2$ and R$^3$ are each independently hydrogen, hydrocarbyl, substituted hydrocarbyl or an inert functional group, provided that any two of R$^1$, R$^2$ and R$^3$ vicinal to one another taken together may form a ring;

R$^4$ and R$^5$ are each independently hydrogen, hydrocarbyl, substituted hydrocarbyl or an inert functional group;

R$^6$ and R$^7$ are each independently a substituted aryl having a first ring atom bound to the imino nitrogen, provided that:
  in R$^6$, a second ring atom adjacent to said first ring atom is bound to a halogen, a primary carbon group, a secondary carbon group or a tertiary carbon group; and further provided that
  in R$^6$, when said second ring atom is bound to a halogen or a primary carbon group, none, one or two of the other ring atoms in R$^6$ and R$^7$ adjacent to said first ring atom are bound to a halogen or a primary carbon group, with the remainder of the ring atoms adjacent to said first ring atom being bound to a hydrogen atom; or
  in R$^6$, when said second ring atom is bound to a secondary carbon group, none, one or two of the other ring atoms in R$^6$ and R$^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom;

By a "first ring atom in $R^6$ and $R^7$ bound to an imino nitrogen atom" is meant the ring atom in these groups bound to an imino nitrogen shown in (I), for example (II)

or (III)

the atoms shown in the 1-position in the rings in (II) and (III) are the first ring atoms bound to an imino carbon atom (other groups which may be substituted on the aryl groups are not shown). Ring atoms adjacent to the first ring atoms are shown, for example, in (IV) and (V), where the open valencies to these adjacent atoms are shown by dashed lines (the 2,6-positions in (IV) and the 2,5-positions in (V)).

(IV)

or (V)

In one preferred compound (I) $R^6$ is (VI)

and $R^7$ is (VII)

wherein:
$R^8$ is a halogen, a primary carbon group, a secondary carbon group or a tertiary carbon group; and
$R^9$, $R^{10}$, $R^{11}$, $R^{14}$, $R^{15}$, $R^{16}$ and $R^{17}$ are each independently hydrogen, hydrocarbyl, substituted hydrocarbyl or a functional group; provided that:
when $R^8$ is a halogen or primary carbon group none, one or two of $R^{12}$, $R^{13}$ and $R^{17}$ are a halogen or a primary carbon group, with the remainder of $R^{12}$, $R^{13}$ and $R^{17}$ being hydrogen; or
when $R^8$ is a secondary carbon group, none or one of $R^{12}$, $R^{13}$ and $R^{17}$ is a halogen, a primary carbon group or a secondary carbon group, with the remainder of $R^{12}$, $R^{13}$ and $R^{17}$ being hydrogen; or
when $R^8$ is a tertiary carbon group, none or one of $R^{12}$, $R^{13}$ and $R^{17}$ is tertiary carbon group, with the remainder of $R^{17}$, $R^{13}$ and $R^{17}$ being hydrogen;
and further provided that any two of $R^8$, $R^9$, $R^{10}$, $R^{11}$, $R^{12}$, $R^{13}$, $R^{14}$, $R^{15}$, $R^{16}$ and $R^{17}$ vicinal to one another, taken together may form a ring.

In the above formulas (VI) and (VII), $R^8$ corresponds to the second ring atom adjacent to the first ring atom bound to the imino nitrogen, and $R^{12}$, $R^{13}$ and $R^{17}$ correspond to the other ring atoms adjacent to the first ring atom.

In compounds (I) containing (VI) and (VII), it is particularly preferred that:
if $R^8$ is a primary carbon group, $R^{13}$ is a primary carbon group, and $R^{12}$ and $R^{17}$ are hydrogen; or
if $R^8$ is a secondary carbon group, $R^{13}$ is a primary carbon group or a secondary carbon group, more preferably a secondary carbon group, and $R^{12}$ and $R^{17}$ are hydrogen; or
if $R^8$ is a tertiary carbon group (more preferably a trihalo tertiary carbon group such as a trihalomethyl), $R^{13}$ is a tertiary carbon group (more preferably a trihalotertiary group such as a trihalomethyl), and $R^{12}$ and $R^{17}$ are hydrogen; or
if $R^8$ is a halogen, $R^{13}$ is a halogen, and $R^{12}$ and $R^{17}$ are hydrogen.

In all specific preferred compounds (I) in which (VI) and (VII) appear, it is preferred that $R^1$, $R^2$ and $R^3$ are hydrogen; and/or $R^4$ and $R^5$ are methyl. It is further preferred that:
$R^9$, $R^{10}$, $R^{11}$, $R^{12}$, $R^{14}$, $R^{15}$, $R^{16}$, and $R^{17}$ are all hydrogen; $R^{13}$ is methyl; and $R^8$ is a primary carbon group, more preferably methyl; or
$R^9$, $R^{10}$, $R^{11}$, $R^{12}$, $R^{14}$, $R^{15}$, $R^{16}$ and $R^{17}$ are all hydrogen; $R^{13}$ is ethyl; and $R^8$ is a primary carbon group, more preferably ethyl; or
$R^9$, $R^{10}$, $R^{11}$, $R^{12}$, $R^{14}$, $R^{15}$, $R^{16}$ and $R^{17}$ are all hydrogen; $R^{13}$ is isopropyl; and $R^8$ is a primary carbon group, more preferably isopropyl; or
$R^9$, $R^{10}$, $R^{11}$, $R^{12}$, $R^{14}$, $R^{15}$, $R^{16}$ and $R^{17}$ are all hydrogen; $R^{13}$ is n-propyl; and $R^8$ is a primary carbon group, more preferably n-propyl; or $R^9$, $R^{10}$, $R^{11}$, $R^{12}$, $R^{14}$, $R^{15}$, $R^{16}$ and $R^{17}$ are all hydrogen; $R^{13}$ is chloro; and $R^8$ is a halogen, more preferably chloro; or $R^9$, $R^{10}$, $R^{11}$, $R^{12}$, $R^{14}$, $R^{15}$, $R^{16}$ and $R^{17}$ are all hydrogen; $R^{13}$ is trihalomethyl, more preferably trifluoromethyl; and $R^8$ is a trihalomethyl, more preferably trifluoromethyl.

In another preferred embodiment of (I), $R^6$ and $R^7$ are, respectively wherein:
$R^{18}$ is a halogen, a primary carbon group, a secondary carbon group or a tertiary carbon group; and
$R^{19}$, $R^{20}$, $R^{23}$ and $R^{24}$ are each independently hydrogen, hydrocarbyl, substituted hydrocarbyl or a functional group;

Provided that:
when $R^{18}$ is a halogen or primary carbon group none, one or two of $R^{21}$, $R^{22}$ and $R^{25}$ are a halogen or a primary carbon group, with the remainder of $R^{21}$ $R^{22}$ and $R^{25}$ being hydrogen; or
when $R^{18}$ is a secondary carbon group, none or one of $R^{21}$, $R^{22}$ and $R^{25}$ is a halogen, a primary carbon group or a secondary carbon group, with the remainder of $R^{21}$, $R^{22}$ and $R^{25}$ being hydrogen;
when $R^{18}$ is a tertiary carbon group, none or one of $R^{21}$, $R^{22}$ and $R^{25}$ is a tertiary carbon group, with the remainder of of $R^{21}$, $R^{22}$ and $R^{25}$ being hydrogen; and further provided that any two of $R^{18}$, $R^{19}$, $R^{20}$, $R^{21}$, $R^{22}$, $R^{23}$, $R^{24}$ and $R^{25}$ vicinal to one another, taken together may form a ring.

In the above formulas (VIII) and (IX), $R^{18}$ corresponds to the second ring atom adjacent to the first ring atom bound to the imino nitrogen, and $R^{21}$, $R^{22}$ and $R^{25}$ correspond to the other ring atoms adjacent to the first ring atom.

In compounds (I) containing (VIII) and (IX), it is particularly preferred that:
if $R^{18}$ is a primary carbon group, $R^{22}$ is a primary carbon group, and $R^{21}$ and $R^{25}$ are hydrogen; or
if $R^{18}$ is a secondary carbon group, $R^{22}$ is a primary carbon group or a secondary carbon group, more preferably a secondary carbon group, and $R^{21}$ and $R^{25}$ are hydrogen; or
if $R^{18}$ is a tertiary carbon group (more preferably a trihalo tertiary carbon group such as a trihalomethyl), $R^{22}$ is a tertiary carbon group (more preferably a trihalotertiary group such as a trihalomethyl), and $R^{21}$ and $R^{25}$ are hydrogen; or
if $R^{18}$ is a halogen, $R^{22}$ is a halogen, and $R^{21}$ and $R^{25}$ are hydrogen.

In all specific preferred compounds (I) in which (VIII) and (IX) appear, it is preferred that $R^1$, $R^2$ and $R^3$ are hydrogen; and/or $R^4$ and $R^5$ are methyl. It is further preferred that:

$R^{19}$, $R^{20}$, $R^{21}$, $R^{23}$ and $R^{24}$ are all hydrogen; $R^{22}$ is methyl; and $R^{18}$ is a primary carbon group, more preferably methyl; or $R^{19}$, $R^{20}$, $R^{21}$, $R^{23}$ and $R^{24}$ are all hydrogen; $R^{22}$ is ethyl; and $R^{18}$ is a primary carbon group, more preferably ethyl; or $R^{19}$, $R^{20}$, $R^{21}$, $R^{23}$ and $R^{24}$ are all hydrogen; $R^{22}$ is isopropyl; and $R^{18}$ is a primary carbon group, more preferably isopropyl; or $R^{19}$, $R^{20}$, $R^{21}$, $R^{23}$ and $R^{24}$ are all hydrogen; $R^{22}$ is n-propyl; and $R^{18}$ is a primary carbon group, more preferably n-propyl; or $R^{19}$, $R^{20}$, $R^{21}$, $R^{23}$ and $R^{24}$ are all hydrogen; $R^{22}$ is chloro or bromo; and $R^{18}$ is a halogen, more preferably chloro or bromo.

Compound (I) and its iron complexes (the oligomerization catalyst) may be prepared by a variety of methods, see for instance U.S. Pat. Nos. 5,955,555, 6,103,946, WO99/50273 (equivalent to U.S. patent application Ser. No. 09/277,910, filed Mar. 29, 1999now U.S. Pat. No. 6,232,259), WO00/08034 and WO00/50470 (all of which are incorporated by reference herein for all purposes as if fully set forth).

Many types of catalysts are useful as the copolymerization catalyst. For instance so-called Ziegler-Natta and/or metallocene-type catalysts may be used. These types of catalysts are well known in the polyolefin field, see for instance Angew. Chem., Int. Ed. Engl., vol. 34, p. 1143–1170 (1995), EP-A-0416815 and U.S. Pat. No. 5,198,401 for information about metallocene-type catalysts; and J. Boor Jr., Ziegler-Natta Catalysts and Polymerizations, Academic Press, New York, 1979 for information about Ziegler-Natta-type catalysts, all of which are hereby included by reference. Many of the useful polymerization conditions for these types of catalysts and the oligomerization catalyst coincide, so conditions for the process are easily accessible. Oftentimes a "co-catalyst" or "activator" is needed for metallocene or Ziegler-Natta-type polymerizations, which is oftentimes the same as is sometimes needed for the oligomerization catalyst. In many instances the same compound, such as an alkylaluminum compound, may be used for these purposes for both types of catalysts.

Suitable catalysts for the copolymerization catalyst also include metallocene-type catalysts, as described in U.S. Pat. No. 5,324,800 and EP-A-0129368; particularly advantageous are bridged bis-indenyl metallocenes, for instance as described in U.S. Pat. No. 5,145,819 and EP-A-0485823. Another class of suitable catalysts comprises the well-known constrained geometry catalysts, as described in EP-A-0416815, EP-A-0420436, EP-A-0671404, EP-A-0643066 WO91/04257. Also the class of transition metal complexes described in, for example, WO98/30609, U.S. Pat. Nos. 5,880,241, 5,955,555, 6,060,569 and 5,714,556 can be used. All of the aforementioned publications are incorporated by reference herein for all purposes as if fully set forth.

The polymerization catalyst for the copolymerization of the ethylene and the α-olefin series should preferably be a catalyst that can copolymerize ethylene and α-olefins so that the relative rate of copolymerization of these two types of monomers are very roughly equal. Metallocene-type catalysts are most preferred, and preferred metallocene catalysts are those listed in previously incorporated WO99/50318

(corresponding to U.S. application Ser. No. 09/619,509, filed Jul. 19, 2000, now abandoned, which is a continuation of U.S. application Ser. No. 09/273,409, filed Mar. 22, 1999, now U.S. Pat. No. 6,214,761). This reference also gives preferred conditions for the simultaneous oligomerization of ethylene using iron complexes of (I) and co-polymerization of ethylene and α-olefins.

For example (one or both of) the catalysts herein may be "heterogenized" (to form a polymerization catalyst component, for instance) by coating or otherwise attaching them to solid supports, such as silica or alumina. Where an active catalyst species is formed by reaction with a compound such as an alkylaluminum compound, a support on which the alkylaluminum compound is first coated or otherwise attached is contacted with the transition metal compounds (or their precursors) to form a catalyst system in which the active polymerization catalysts are "attached" to the solid support. These supported catalysts may be used in polymerizations in organic liquids. They may also be used in so-called gas phase polymerizations in which the olefin(s) being polymerized are added to the polymerization as gases and no liquid supporting phase is present. The transition metal compounds may also be coated onto a support such as a polyolefin (polyethylene, polypropylene, etc.) support, optionally along with other needed catalyst components such as one or more alkylaluminum compounds.

The polymers produced herein will have branching patterns corresponding roughly to the distribution of olefins in the α-olefin series of the formula $H_2C{=}CHR^{20}$, plus any other added α-olefin. However in branched polyethylenes in which $R^{20}$ contains more than 6–10 (depending on the $^{13}C$ NMR equipment used) carbon atoms, one may not be able to directly tell the difference between those and longer branches, so direct measurement of longer branches in the polymer formed may not be possible. However preferred polymers have 1 or more, preferably 1 to 100, more preferably 1 to 30, of $-R^{20}$ branches per 1000 methylene atoms. The amount of these branches (as measured by total methyl groups) in the polymer preferably ranges from about 2 to about 200, especially preferably about 5 to about 175, more preferably about 10 to about 150, and especially preferably about 20 to about 150 branches per 1000 methylene groups in the polymer (for the method of measurement and calculation, see previously incorporated U.S. Pat. No. 5,880, 241). Another preferable range for these branches is about 50 to about 200 methyl groups per 1000 methylene carbon atoms. It is also preferable (either alone or in combination with the other preferable features above) that in these branched polymers there is at least 2 branches each of ethyl and n-hexyl or longer and at least one n-butyl per 1000 methylene groups, more preferably at least 4 branches each of ethyl and n-hexyl or longer and at least 2 n-butyl branches per 1000 methylene groups, and especially preferably at least 10 branches each of ethyl and n-hexyl or longer and at least 5 n-butyl branches per 1000 methylene groups. It is also preferred that there are more ethyl branches than butyl branches in this homopolyethylene. In another preferred polymer (alone or in combination with any of the above preferred features) there is less than 20 methyl branches, more preferably less than 2 methyl branch, and especially preferably less than 2 methyl branches per 1000 methylene groups. All of the above branching levels measured by $^{13}C$ NMR are after correction for end groups.

If one assumes that the rate of copolymerization of each of the α-olefins is proportional to its mole fraction in the α-olefin series, then the ratios of $-R^{20}$ branches in the resulting polymer will correspond to the molar ratio in the α-olefin series. However this may not be quite correct, especially for volatile olefins such as 1-butene and 1-hexene, some of which may be lost to the polymerization reaction by volatilization, depending on the particular equipment and process used for the polymerization.

Figure 1:
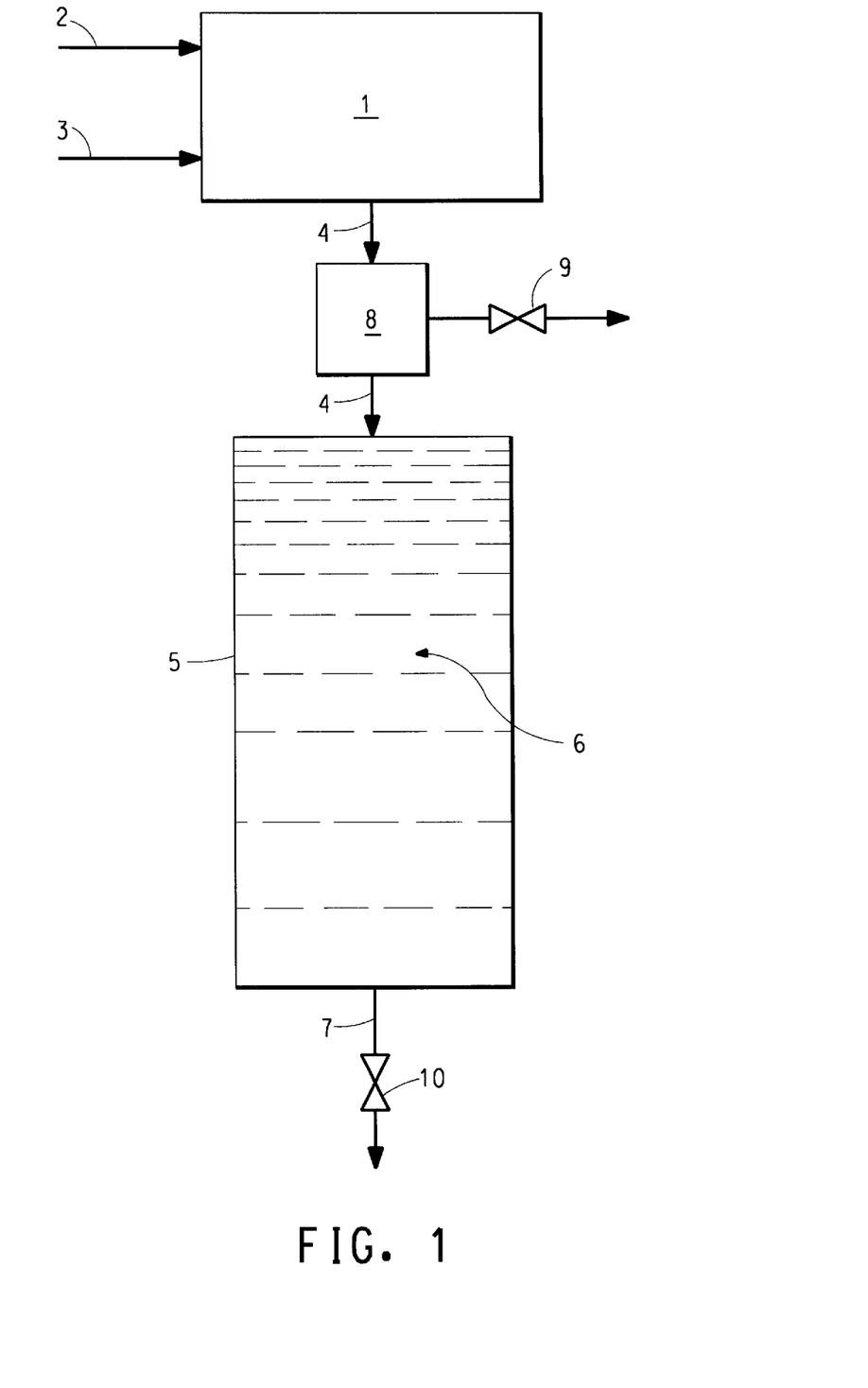
FIG. 1 shows a schematic flow chart for one possible variation of the present process employing a single CSTR followed by a single PFR in series.

The apparatus used in the present process comprises one or more, preferably one, CSTR reactors where the majority of the polymer is formed, followed in series by at least one, preferably one, PFR, where a minority of the polymer is formed, and any needed auxiliary equipment normally associated with a polymerization process, such as one or more of temperature controls, pressure controls, heat exchangers, pumps, compressors, valves, stirrers, monomer feed(s), catalyst feed(s), excess monomer takeoff(s), etc. FIG. 1 shows a schematic flow chart for one possible variation of the present process employing a single CSTR and single PFR in series. In FIG. 1, CSTR 1 is fed ethylene through line 2 to maintain an appropriate ethylene pressure in 1. Also fed into 1 through feed line 3 (which may be more than one line) are the oligomerization and polymerization catalysts, and optionally (for a slurry or solution process) a solvent or slurrying liquid. Other feed lines (not shown) may also be present. After remaining in 1 for the desired amount of time (presumably the desired residence time), the process components are conveyed through transfer line 4 to PFR 5, which is filled with the process ingredients 6. At the far end (from transfer line 4) of PFR 5 is a product exit line 7 with a valve 10. After exiting, the polymer product is isolated and/or processed in the normal way by equipment that is not shown. Also shown in transfer line 4 is an optional gas separator 8 which separates the gas from the other liquid and/or solid process components. This gas exits through letdown valve 9. The gas that exits, presumably mostly unreacted ethylene (and possibly containing other olefins volatile under the separation conditions), may be discarded, or optionally purified and then recycled. Not shown is certain auxiliary equipment which may be present, such as a stirrer for the CSTR, pump(s), compressor(s), and control equipment such as thermocouples.

The majority of the polymer formed in the process is made in the CSTR, preferably at least 80 weight percent, more preferably at least 90 weight percent, and especially preferably at least 95 weight percent. This may best be done by making as much polymer in the CSTR as possible. While it is not necessary to remove unreacted ethylene from process stream when going from the CSTR to the PFR, doing so reduces the total amount of monomer (olefin) available to the polymerization in the PFR and so will reduce the proportion of polymer made in the PFR. Reducing the amount of polymer made in the PFR also reduces the need for cooling the PFR to remove the heat of polymerization from the PFR (which may be more difficult than in the CSTR), so making as much polymer in CSTR as possible also has this advantage.

Since it is desired to allow the polymerization to continue in the PFR 5, the conditions within PFR 5 should be such that at least the polymerization catalyst is active. Since most polymerization catalysts function best in the absence of water and/or oxygen, it will usually be preferable to exclude these materials. If some ethylene enters PFR 5, it will presumably be (almost) used up by polymerization and/or oligomerization, and therefore in order to avoid pressures in PFR 5 below atmospheric pressure (which will tend to brings air into the reactor) it may be desirable to keep the pressure in PFR 5 at or above atmospheric pressure by addition of an inert gas such as nitrogen.

The reactions taking place in the CSTR may be so-called gas phase, solution or slurry types of polymerizations (and oligomerizations). There may be one or more CSTR in series and/or parallel. Although CSTRs are most often associated with reactions in which there is a liquid phase, herein gas phase reactions are also applicable as long as there is continuous feed of ingredients to the reactor, a continuous takeoff of product(s) (and sometimes excess ingredients), and the material in the reactor is of a fairly uniform composition because the process ingredients are effectively agitated so they are fairly uniform. For example, in many gas phase polymerization reactors the particles on (in) which the polymerization is taking place typically are well agitated, and the gas phase, containing the monomer(s) may in theory be in plug flow, but in practice the composition of the gas phase is often quite uniform because of agitation and/or rapid gas flow in the reactor. These types of reactors qualify herein as CSTRs. Generally speaking in such a gas phase process the catalyst is often introduced in a supported form on a solid particulate support, and the polymer grows on this support forming (larger) polymer particles. In this type of reactor, the particles present often are part of a fluidized bed, which is fluidized by gaseous monomer such as ethylene, and sometimes an inert gas such as propane or pentane, the latter being present often to help with removal of the heat of reaction (polymerization), so the reactor contents will not overheat (for example the so-called "supercondensing mode"). Typical gas phase reactors which may be the CSTR of this invention include those described in EP-A-0351068, EP-A-0476835, U.S. Pat. Nos. 4,003,712, 4,011,382, 4,349, 648, 5,610,244, 5,684,097 and 5,698,642 (all of which are incorporated by reference herein for all purposes as if fully set forth). These may be "simple" single chamber fluidized bed reactors, or loop-type fluidized bed reactors.

The CSTR may contain a solution polymerization, see for instance WO96/33227 and WO97/36942 (both incorporated by reference herein for all purposes as if fully set forth). The CSTR in this instance may be a single stirred vessel, as in previously incorporated WO96/33227, or it may be a loop reactor with the limitations noted above for loop gas phase reactors, as in previously incorporated WO97/36942.

The CSTR may also be for a suspension polymerization, see for instance WO92/12181, U.S. Pat. No. 5684097, and *J. Appl. Polym. Sci., Polym. Symp.*, vol. 36, p. 49 et seq. (1981) (all of which are incorporated by reference herein as if fully set forth). Again the reactor may be simple stirred vessel or a loop reactor, subject to the same conditions noted above.

In all cases, the internal volumes of transfer line 4 and gas separator 8 are preferably as small as possible so that residence times in these parts of the apparatus are minimized and hence the amount of polymer formed in these parts of the apparatus is also minimized.

For the various types of polymerizations, the PFR may assume any configuration in which the process material may be handled and of course that the reactor acts as a PFR.

For example, for the polymer particulates from a gas reaction, the PFR may simply be a vertical pipe or tube (which is not a fluidized bed) through which the solid particles flow under the force of gravity to the exit of the PFR. A conveyor, such as a screw conveyor may be present to assist this axial flow in the PFR, but this conveyor should not provide any substantial amount of axial mixing in the PFR.

For a polymer solution the PFR may simply be a pipe or tube through which the process liquid flows. A pump may be provided to assist the liquid flow. For a polymer suspension the PFR may again be a tube or pipe; however, settling of the suspension may be a problem, so some kind of agitation may be needed to keep the polymer suspended without causing axial mixing. Alternatively the pipe or tube may be vertical, and the suspension be allowed to settle under the force of gravity and the solid suspended material and liquid mixture removed at the bottom.

In all instances the residence time of the process materials in the PFR, in particular the polymer or more accurately the growing polymer chains should preferably be long enough to reduce the amount of free alpha-olefin in the process to the desired level in the final product exiting the PFR. Preferably, the residual α-olefin content at the end of the reaction (e.g., coming out of the PFR) is at least 20% less, more preferably at least 50% less, and especially at least 75% less, than the residual α-olefin content exiting the first part of the reaction (e.g., the CSTR).

If ethylene is not vented before entering the PFR this residence time may be longer, since alpha-olefin may be formed until most or all of the ethylene is exhausted by polymerization and oligomerization. This residence time will be dependent on the particular polymerization catalyst used, the polymerization conditions, the initial level of α-olefins entering the PFR, and desired level of α-olefins that should be in the material exiting the PFR, and may be determined by simple experimentation.

Preferred polymerization methods in the CSTR are solution and gas phase polymerizations, and gas phase polymerizations are particularly preferred.

"Polymerization conditions" merely refers to the reaction conditions within the various stages. As indicated above, it is preferred in the first stage that olgiomeration and (co) polymerization rates are comparable, and thus the "polymerization conditions" in this first stage are conditions in which both oligomerization and (co)polymerization occur. To the extent not described above, these conditions are known or readily determined by those of ordinary skill in the art, as exemplified by the disclosure of previously incorporated WO99/50318 (corresponding to U.S. application Ser. No. 09/619,509, filed Jul. 19, 2000, now abandoned, which is a continuation of U.S. application Ser. No. 09/273,409, filed Mar. 22, 1999 now U.S. Pat. No. 6,214,761).

What is claimed is:

1. A process for the production of a branched polyethylene comprising the steps of contacting, under polymerization conditions:

(a) ethylene;

(b) an oligomerization catalyst that oligomerizes ethylene to one or more α-olefins of the formula $R^{20}CH=CH_2$, wherein $R^{20}$ is n-alkyl containing an even number of carbon atoms, and (c) a transition metal polymerization catalyst that copolymerizes ethylene and one or more of the α-olefins produced by the oligomerization catalyst, to produce a first product comprising a predominant amount of a branched polyethylene, a first residual α-olefin content and, optionally, an amount of unreacted ethylene; then (2) allowing the first product to further react under conditions to (co)polymerize at least a portion of the first residual α-olefin content, in the substantial absence of added ethylene, to result in a second product comprising a branched polyolefin having a second residual α-olefin content, provided that said second residual α-olefin content is at least 20% less than said first residual α-olefin content.

2. The process of claim 1, wherein the oligomerization catalyst comprises an iron complex of a compound of the formula (I)

(I)

wherein:

R¹, R² and R³ are each independently hydrogen, hydrocarbyl, substituted hydrocarbyl or an inert functional group, provided that any two of R¹, R² and R³ vicinal to one another taken together may form a ring;

R⁴ and R⁵ are each independently hydrogen, hydrocarbyl, substituted hydrocarbyl or an inert functional group;

R⁶ and R⁷ are each independently a substituted aryl having a first ring atom bound to the imino nitrogen, provided that:

in R⁶, a second ring atom adjacent to said first ring atom is bound to a halogen, a primary carbon group, a secondary carbon group or a tertiary carbon group; and further provided that in R⁶, when said second ring atom is bound to a halogen or a primary carbon group, none, one or two of the other ring atoms in R⁶ and R⁷ adjacent to said first ring atom are bound to a halogen or a primary carbon group, with the remainder of the ring atoms adjacent to said first ring atom being bound to a hydrogen atom; or in R⁶, when said second ring atom is bound to a secondary carbon group, none, one or two of the other ring atoms in R⁶ and R⁷ adjacent to said first ring atom are bound to a halogen, a primary carbon group or a secondary carbon group, with the remainder of the ring atoms adjacent to said first ring atom being bound to a hydrogen atom; or in R⁶, when said second ring atom is bound to a tertiary carbon group, none or one of the other ring atoms in R⁶ and R⁷ adjacent to said first ring atom are bound to a tertiary carbon group, with the remainder of the ring atoms adjacent to said first ring atom being bound to a hydrogen atom.

3. The process of claim 2, wherein R⁶ is (VI)

and R⁷ is (VII)

wherein:

R⁸ is a halogen, a primary carbon group, a secondary carbon group or a tertiary carbon group; and R⁹, R¹⁰, R¹¹, R¹⁴, R¹⁵, R¹⁶ and R¹⁷ are each independently hydrogen, hydrocarbyl, substituted hydrocarbyl or a functional group; provided that:

when R⁸ is a halogen or primary carbon group none, one or two of R¹², R¹³ and R¹⁷ are a halogen or a primary carbon group, with the remainder of R¹², R¹³ and R¹⁷ being hydrogen; or when R⁸ is a secondary carbon group, none or one of R¹², R¹³ and R¹⁷ is a halogen, a primary carbon group or a secondary carbon group, with the remainder of R¹², R¹³ and R¹⁷ being hydrogen; or when R⁸ is a tertiary carbon group, none or one of R¹², R¹³ and R¹⁷ is tertiary carbon group, with the remainder of R¹², R¹³ and R¹⁷ being hydrogen;

and further provided that any two of R⁸, R⁹, R¹⁰, R¹¹, R¹², R¹³, R¹⁴, R¹⁵, R¹⁶ and R¹⁷ vicinal to one another, taken together may form a ring.

4. The process of claim 1, wherein the polymerization catalyst is a metallocene catalyst.

5. The process of claim 1, wherein the first product is produced in a continuous stirred tank reactor.

6. The process of claim 1, wherein the second product is produced in a plug flow reactor.

7. The process of claim 5, wherein the second product is produced in a plug flow reactor.

8. The process of claim 1, wherein unreacted ethylene is vented from the first product.

9. The process of claim 7, wherein ethylene is vented from the first product prior to entering the plug flow reactor.

10. The process of claim 1, wherein said second residual α-olefin content is at least 50% less than said first residual α-olefin content.

11. The process of claim 1, wherein said second residual α-olefin content is at least 75% less than said first residual α-olefin content.

12. The process of claim 1, wherein the branched polyethylene is a homopolyethylene.

13. A process for the production of a branched polyethylene, comprising the step of contacting, under polymerizing conditions:

(a) ethylene, (b) an ethylene oligomerization catalyst which is capable under the process conditions of producing one or more olefins of the formula $R^{20}CH=CH_2$ wherein $R^{20}$ is n-alkyl containing an even number of carbon atoms, and (c) a polymerization catalyst which contains one or more transition metals and which is capable under process conditions of copolymerizing ethylene and one or more olefins of the formula $R^{21}CH=CH_2$, wherein $R^{21}$ is n-alkyl, provided that a major portion of the branched polyethylene is produced first in a continuous stirred tank reactor, and that a minor portion of said branched polyethylene is produced subsequently in a plug flow reactor.

14. The process of claim 13, wherein the oligomerization catalyst comprises an iron complex of a compound of the formula (I)

(I)

wherein:

$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;

$R^4$ and $R^5$ are each independently hydrogen, hydrocarbyl, substituted hydrocarbyl or an inert functional group;

$R^6$ and $R^7$ are each independently a substituted aryl having a first ring atom bound to the imino nitrogen, provided that:

in $R^6$, a second ring atom adjacent to said first ring atom is bound to a halogen, a primary carbon group, a secondary carbon group or a tertiary carbon group; and further provided that in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

15. The process of claim 14, wherein $R^6$ is (VI)

and $R^7$ is (VII)

wherein:

$R^8$ is a halogen, a primary carbon group, a secondary carbon group or a tertiary carbon group; and $R^9$, $R^{10}$, $R^{11}$, $R^{14}$, $R^{15}$, $R^{16}$ and $R^{17}$ are each independently hydrogen, hydrocarbyl, substituted hydrocarbyl or a functional group; provided that:

when $R^8$ is a halogen or primary carbon group none, one or two of $R^{12}$, $R^{13}$ and $R^{17}$ are a halogen or a primary carbon group, with the remainder of $R^{12}$, $R^{13}$ and $R^{17}$ being hydrogen; or when $R^8$ is a secondary carbon group, none or one of $R^{12}$, $R^{13}$ and $R^{17}$ is a halogen, a primary carbon group or a secondary carbon group, with the remainder of $R^{12}$, $R^{13}$ and $R^{17}$ being hydrogen; or when $R^8$ is a tertiary carbon group, none or one of $R^{12}$, $R^{13}$ and $R^{17}$ is tertiary carbon group, with the remainder of $R^{12}$, $R^{13}$ and $R^{17}$ being hydrogen;

and further provided that any two of $R^8$, $R^9$, $R^{10}$, $R^{11}$, $R^{12}$, $R^{13}$, $R^{14}$, $R^{15}$, $R^{16}$ and $R^{17}$ vicinal to one another, taken together may form a ring.

16. The process of claim 13, wherein the polymerization catalyst is a metallocene catalyst.

17. The process of claim 13, wherein ethylene is vented prior to the plug flow reactor.

18. The process of claim 13, wherein the plug flow reactor is operated in the substantial absence of added ethylene.

19. The process of claim 13, wherein at least about 80 wt % of the branched polyethylene is made in the continuous stirred tank reactor.

20. The process of claim 13, wherein said branched polyethylene is a homopolyethylene.

* * * * *